United States Patent
Joachim

(10) Patent No.: US 6,364,042 B1
(45) Date of Patent: Apr. 2, 2002

(54) METHOD AND APPARATUS FOR COUPLING AN ENGINE AND TRANSMISSION WITH A STARTER/ALTERNATOR

(75) Inventor: Jon Barry Joachim, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/558,601

(22) Filed: Apr. 26, 2000

(51) Int. Cl.$^7$ .............................. B60K 1/00; B60K 6/00; B60L 11/02

(52) U.S. Cl. ................... 180/65.2; 180/65.4; 290/45; 290/36 R; 290/31

(58) Field of Search ............................. 180/65.2, 65.3, 180/65.4, 65.8; 290/36 R, 46, 47, 32, 31, 27, 22, 19, 15, 14, 12, 11, 10

(56) References Cited

U.S. PATENT DOCUMENTS

| | | | |
|---|---|---|---|
| 4,533,011 A | | 8/1985 | Heidemeyer et al. |
| 5,001,412 A | * | 3/1991 | Carter et al. .................. 322/10 |
| 5,075,616 A | * | 12/1991 | Mitsui ......................... 322/10 |
| 5,172,006 A | | 12/1992 | Suzuki et al. |
| 5,619,956 A | * | 4/1997 | Koziara et al. .......... 123/41.31 |
| 5,856,709 A | * | 1/1999 | Ibaraki et al. ................ 290/45 |
| 5,881,559 A | * | 3/1999 | Kawamura .................... 60/597 |
| 6,064,161 A | * | 5/2000 | Takahara et al. ............. 318/139 |
| 6,073,713 A | * | 6/2000 | Brandenburg et al. ...... 180/65.2 |
| 6,176,808 B1 | * | 1/2001 | Brown et al. .................. 477/5 |
| 6,177,734 B1 | * | 1/2001 | Masberg et al. .............. 290/31 |
| 6,196,344 B1 | * | 3/2001 | Tamor ........................ 180/65.4 |
| 6,204,577 B1 | * | 3/2001 | Chottiner et al. ............. 310/42 |
| 6,233,935 B1 | * | 5/2001 | Kahlon et al. ............. 60/605.1 |

* cited by examiner

*Primary Examiner*—J. J. Swann
*Assistant Examiner*—David Divine
(74) *Attorney, Agent, or Firm*—Jennifer Stec

(57) ABSTRACT

A starter/alternator system 40 for an automotive vehicle 10 with an internal combustion engine 12 has a crankshaft 50 coupled to pistons 16 and a flywheel 90 coupled to the crankshaft 50. The vehicle 10 also has a transmission 20 having an input shaft 22. A starter/alternator 42 has a rotor 48 and a stator 46. The rotor 42 is fixedly coupled to the input shaft 22. A clutch 52 selectively couples the input shaft 22 and the crankshaft 50. The rotor 48 has a rotor carrier 70 and a rotor coil 71. The rotor carrier 70 has a radially extending portion 72 and an annular portion 74 spaced from the input shaft 22. The annular portion 74 has an inner surface 80 and outer surface 82 wherein the rotor coil 71 is fixedly coupled to the outer surface 82.

15 Claims, 3 Drawing Sheets

METHOD AND APPARATUS FOR COUPLING AN ENGINE AND TRANSMISSION WITH A STARTER/ALTERNATOR

TECHNICAL FIELD

The present invention relates generally to internal combustion engines for automotive vehicles, and more specifically, to an automotive vehicle having a starter/alternator coupled between the engine and transmission and to a method for engaging and disengaging the engine from the transmission.

BACKGROUND

Automotive vehicles with internal combustion engines are typically equipped with both a starter motor and alternator positioned in different locations on the engine. In recent years, a combined alternator and starter motor has been proposed. To date the cost and complexity of combining these systems into one device has prevented it from being used in a production embodiment.

With new interest in hybrid electric vehicles, the starter-alternator can assume other functions such as stopping and restarting the engine to save fuel during idle and deceleration, aiding the engine during heavy accelerations and capturing energy during decelerations.

Known systems typically have a rotor mounted directly to the crankshaft of the engine and a stator sandwiched between the engine block and the bell housing of the transmission. During startup of the vehicle, the starter/alternator functions as a starter rotating the crankshaft of the engine while the cylinders are fired. After the engine is started, the starter/alternator is used as a generator to maintain the electrical system of the vehicle.

One drawback to such systems is that the rotor remains fixedly attached to the crankshaft. When the engine is not operating, it may be desirable to provide the transmission with power supplied by the starter-alternator. However, to do this the crankshaft of the unoperating engine is rotated. This is inefficient because an increased amount of power must be provided.

It would therefore be desirable to disengage the engine from the starter/alternator rotor to reduce the inefficiency of turning the crankshaft of the engine when operation of the engine is not required.

SUMMARY OF THE INVENTION

It is therefore one object of the invention to increase the efficiency of the starter/alternator during operation of the vehicle under the control of the starter/alternator.

In one aspect of the invention, a starter/alternator system for an automotive vehicle with an internal combustion engine has a crankshaft coupled to pistons and a flywheel coupled to the crankshaft. The vehicle also has a transmission having an input shaft. A starter/alternator has a rotor and a stator. The rotor is fixedly coupled to the input shaft. A clutch selectively couples the input shaft and the crankshaft.

The rotor has a rotor carrier and a rotor coil. One feature of the invention is that the rotor carrier has a radially extending portion and an annular portion spaced from the input shaft. The annular portion has an inner surface and outer surface wherein the rotor coil is fixedly coupled to the outer surface.

In another aspect of the invention, the starter/alternator may be used to inertia balance the engine. That is, the starter/alternator may be modulated to provide a torque to reduce the effective inertia of the starter/alternator system so that the engine does not have an increased inertial load due to the starter/alternator system.

One advantage of the invention is that axial movement of the rotor with respect to the stator due to magnetic forces is reduced.

Other objects and features of the present invention will become apparent when viewed in light of the detailed description of the preferred embodiment when taken in conjunction with the attached drawings and appended claims.

DESCRIPTION OF THE PREFERRED EMBODIMENT

The present invention is described with respect to a particular configuration of a starter/alternator. However, the teachings of the present invention may be applied to various starters for internal combustion engines.

Figure 1:
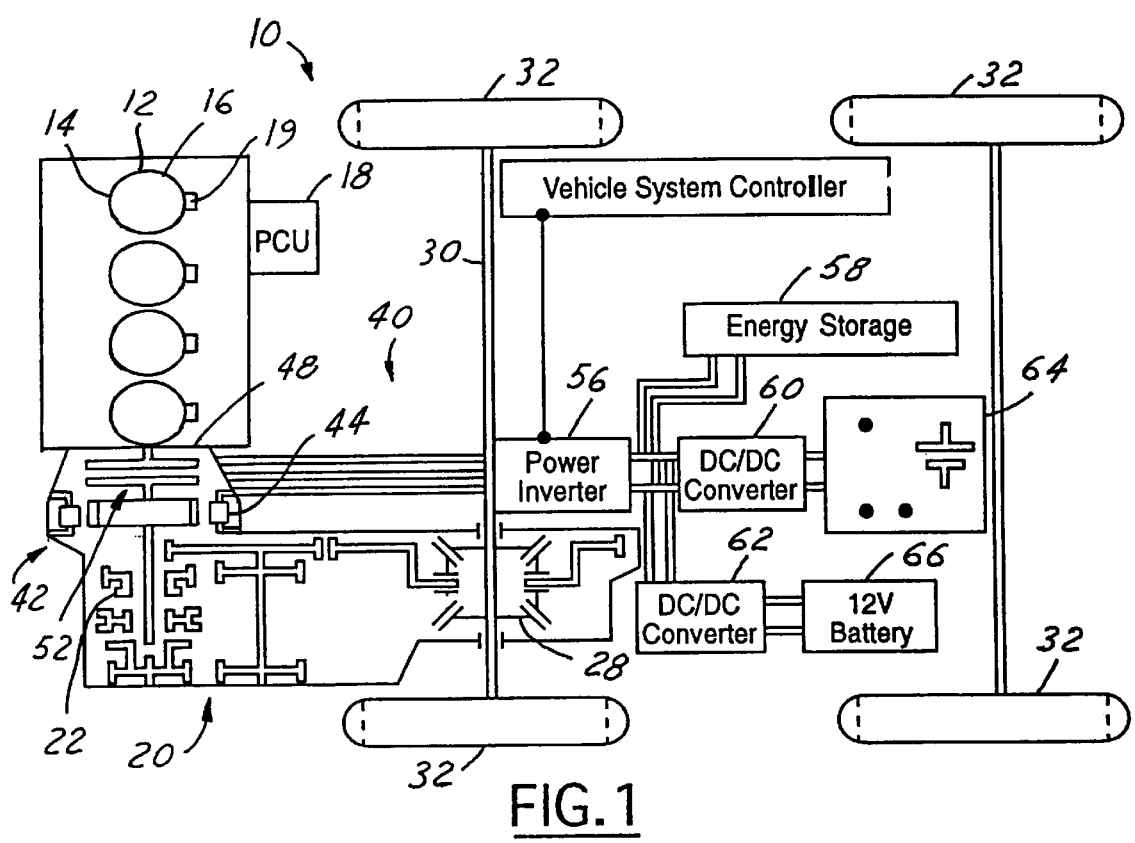
FIG. 1 is a schematic view of an automotive vehicle having a starter/alternator system according to the present invention.

Referring now to FIG. 1, an automotive vehicle 10 is illustrated having an internal combustion engine 12 having cylinders 14 with pistons 16 located therein. Each cylinder 14 is coupled to a fuel pump through a fuel injector (not shown) or other fuel delivery system. Each cylinder 14 also has a spark plug 19 or other ignition source coupled to a powertrain control unit 18. Powertrain control unit 18 controls the ignition timing and fuel pump operation in a conventional manner subject to the improvements of the present invention.

Engine 12 is coupled to a transmission 20. Transmission 20 may be automatic, manual or continuously variable. Transmission 20 has a transaxle input shaft 22. Transmission 20 is coupled to a differential 28 to drive an axle 30 to provide power to wheels 32. Of course, the present invention is also applicable to four wheel drive systems in which all of the wheels 32 are driven. A starter/alternator system 40 that includes a starter/alternator 42 and its associated control electronics is coupled to engine 12. In the present invention, starter/alternator 42 is positioned between a housing 44 of transmission 26 and the engine 12. Starter/alternator 42 has a stator 46 fixedly attached to bell housing 44 and a rotor 48 selectively coupled to a crankshaft 50 of engine 12 and fixedly coupled to transmission 20. A clutch 52 is used to engage and disengage engine 12 from transmission 26. As will be further described below, starter/alternator 42 is used as a starter during engine startup and as an alternator to supply power to recharge the batteries of the vehicle and to supply electrical loads. Clutch 52 allows starter/alternator 42 to decouple the engine 12 and transmission 26 during stops or idle of engine 12.

Starter/alternator system 40 has a system controller 54 that is coupled to powertrain control unit 18 and to a power inverter 56. In practice, the power inverter 56 and system controller 54 may be contained in a single package. As will be further described below, system controller 54 may be used to control the coupling and decoupling of the crankshaft and the transmission by controlling the operation of the clutch actuator in the starter/alternator 42. The inverter 56 is used to convert DC power to AC power in the startup mode and AC power to DC power in power generation mode as will be further described below.

Power inverter 56 may be coupled to an energy storage device 58 such as an ultra capacitor, a first DC to DC converter 60, and a second DC to DC converter 62. In the configuration shown, DC to DC converter 60 is coupled to a 36 volt battery 64. DC to DC converter 62 is coupled to a 12 volt battery 66. Of course, the actual battery voltage, the number of storage devices and the number of DC to DC converters is dependent on the particular system to which it is attached.

Figure 2:
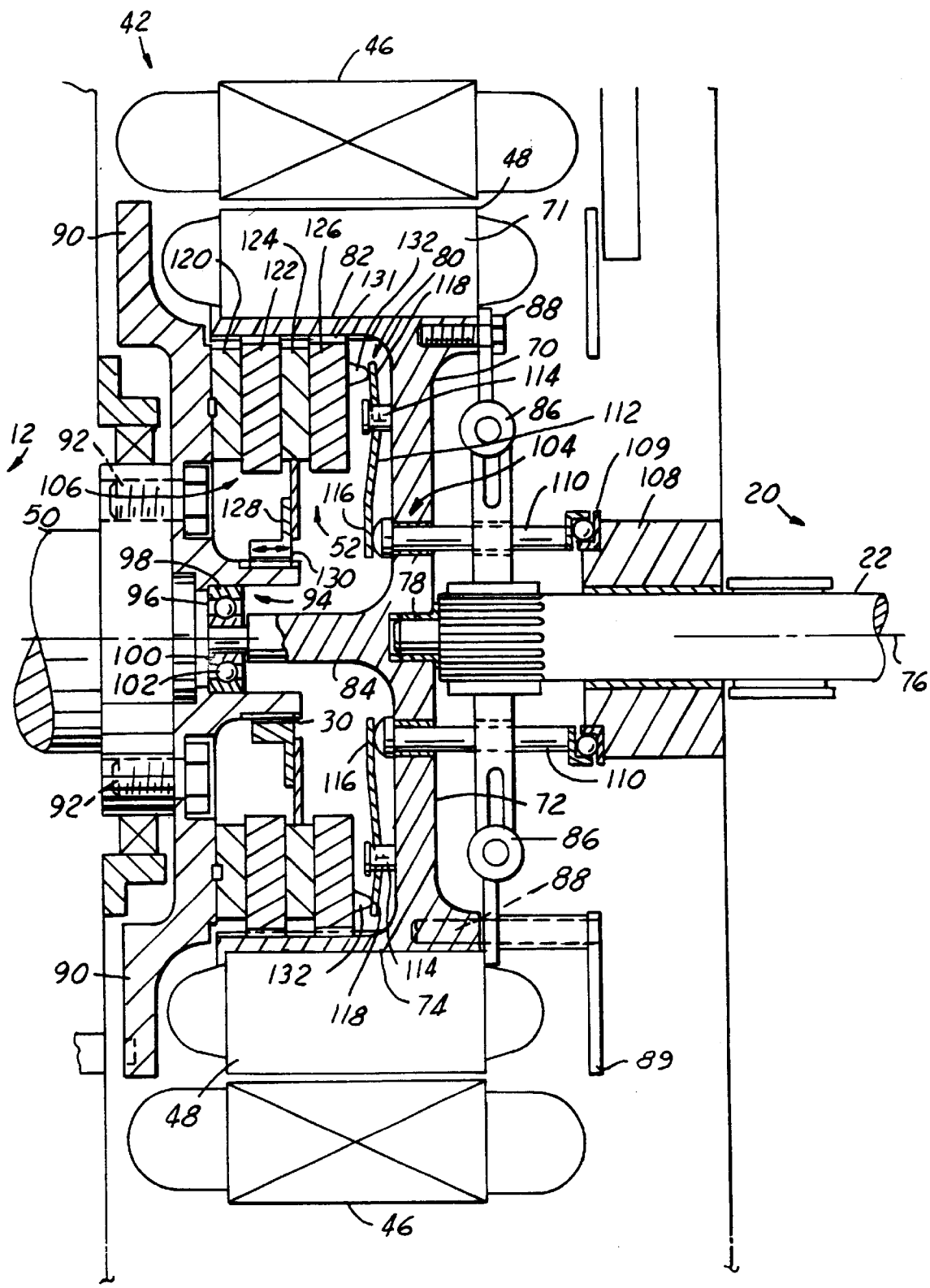
FIG. 2 is a cross-sectional view of the starter/alternator engaging the transmission and engine.

Referring now to FIG. 2, starter/alternator 42 is illustrated in further detail with clutch 52 shown in engagement. Rotor 48 has a rotor carrier 70 and a rotor winding 71. Rotor carrier 70 is fixedly coupled to input shaft 22. Therefore, input shaft 22 and rotor carrier 70 simultaneously rotate. Rotor carrier 70 has a radially extending portion 72 and an axially extending portion 74. Radially extending portion 72 extends a predetermined distance from a longitudinal axis 76 of the system. Longitudinal axis 76 is preferably co-extensive with crankshaft 50, rotor carrier 70 and input shaft 22. A bushing 78 may be used to couple input shaft 22 and rotor carrier 70. Rotor carrier 70 generally has a cup shape having an interior portion 80 and an exterior portion 82 defined by axially extending portion 74. Rotor winding 71 is positioned on exterior portion 82. Rotor carrier 70 has an axial nose portion 84. Nose portion 84 lies on the longitudinal axis 76 of rotor carrier 70 and is thus coaxial with crankshaft 50 and input shaft 22. A support bracket 86 is used in conjunction with fasteners 88 to connect rotor carrier 70 to input shaft 22. A position sensor target 89 may be coupled to rotor carrier 70 to provide feedback to system controller 54.

Crankshaft 50 has a flywheel 90 secured thereto through fasteners 92. Flywheel 90 has a cup shaped portion 94 that is used to receive a bearing 96. Bearing 96 has an outer race 98, and inner race 100, and bearing balls 102. Outer race 98 is fixedly coupled to shaft 50 while inner race 100 is fixedly coupled to nose portion 84. Bearing balls 102 allow rotor carrier 70 and crankshaft 50 to rotate independently.

Clutch 52 is used to engage and disengage crankshaft 50 from input shaft 22. Clutch 52 has an actuator assembly 104 and a friction plate portion 106.

Actuator assembly 104 has a slave cylinder 108 that is stationary with transmission. Slave cylinder 108 has an internal piston that, through a thrust bearing 109, provides force to and moves axially actuator assembly rods 110 which extend through radially extending portion 72. Actuator portion 104 engages a diaphragm spring 112 pivotally coupled at a plurality of pivot points 114. Diaphragm 112 has an inner portion 116 closest to longitudinal axis 76 and an outer portion 118 furthest away from longitudinal axis 76. Actuator portion 104 moves in an axial direction pivoting inner portion 116 and outer portion 118 about pivot point 114. As piston 110 moves in an axial direction toward crankshaft 50, input portion 116 rotates about pivot point 114 so that outer portion 118 pivots toward input shaft 22.

Friction portion 106 is comprised of a pair of friction plates 120 and 124, and a pair of separation plates 122, 126. Two friction plates and two separator plates are illustrated. The friction plates are preferably formed of commonly used clutch materials. However, various numbers of friction plates may be used as would be evident to those skilled in the art. Friction plate 120 is fixedly coupled to flywheel 90 and has a single friction surface opposite flywheel. Friction plate 124 is slidably coupled to flywheel 90 with a support 128. Support 128 engages the outer portion of cup shaped portion 94. Support 128 moves in an axial direction within a spline 130.

Separator plates 122 and 126 are coupled to interior portion 80 of axially extending portion 74 of rotor carrier 70. Separator plates 122 and 126 are slidably engaged in a spline 131. Thus, as rotor carrier 70 rotates with input shaft 22, separator plates 122 and 126 rotate. As flywheel 90 rotates, friction plates 120 and 124 rotate. Separator plate 126 has a ridge 132 thereon. Ridge 132 is used to engage outer portion 118 of diaphragm spring 112.

As is illustrated in FIG. 2, actuator assembly rods 110 apply no pressure to friction plates 120, 122, 124, and 126 so that rotor carrier 70 is engaged with flywheel 90. Both input shaft 22 and crankshaft 50 rotate together. Thus, the bearing 86 does not rotate relatively.

Figure 3:
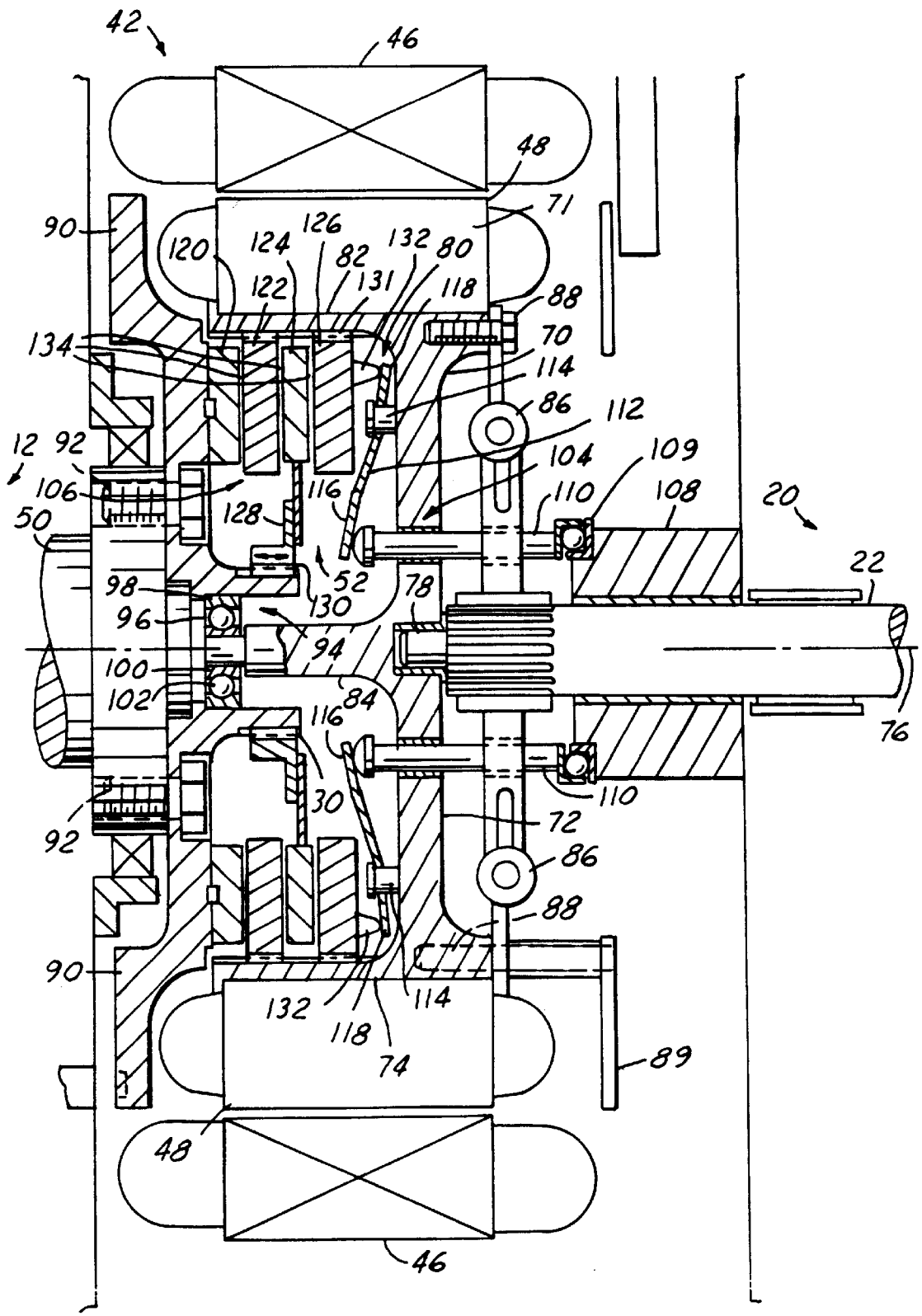
FIG. 3 is a cross-sectional view of the starter/alternator disengaging the transmission and engine.

Referring now to FIG. 3, clutch 52 is shown in disengagement. Actuator assembly rods 110 are extended in an axial direction toward crankshaft 50 that allows diaphragm spring 112 to rotate in a clockwise manner (top portion). Thus, outer portion 118 of diaphragm spring 112 moves toward input shaft 22 allowing friction and separator plates 122, 124, and 126 to separate. Thus, rotor carrier 70 is disengaged from crankshaft 50. Rotor carrier 70 rotates with input shaft 22. Rotor carrier 70 rotates relative to crankshaft 50 at bearing 96. During motor rotation, bearing 96 holds rotor carrier 70 in an axial position within cup shaped portion 94. To re-engage rotor carrier 70 and crankshaft 50, spaces 134 are eliminated by actuator assembly rods 110 moving in a direction toward input shaft 22 to allow outer portion 118 to rotate in a counterclockwise direction so that friction and separator plates 122, 124, and 126 slide toward crankshaft 50 and engage each other and friction plate 120.

In operation of the starter/alternator system 40, the starting process of engine 12 is initiated by a key placed in the start position or the depression of the accelerator pedal (not shown) with key placed in run position. Clutch 52 engages the crankshaft 50 with input shaft 22. Thirty-six volt battery 64 provides electrical power for starter/alternator 42 that may be up converted to a higher voltage by DC to DC converter 60. This higher voltage is used to charge energy storage 58. Inverter 56 converts the DC power to three-phase AC power. The AC power is supplied to the stator 46 of starter/alternator 42. The starter/alternator 42 rotates rotor 48 which in turn rotates crankshaft 50 of engine 12.

When the rotor 48 reaches a predetermined speed, the engine 12 is started by supplying fuel through fuel pump and controlling the spark timing through spark plugs 19 through powertrain control unit 18.

In the generating mode (after the engine has started), the energy storage system 58, and batteries 64, 66 are monitored to determine whether they are fully charged. If any of the energy storage sources drop below a predetermined range, three-phase AC power from starter/alternator 42 is converted to DC by power inverter 56. DC to DC converters 60, 62 are used to convert the possibly higher voltage DC to 42 volts and 14 volts DC respectively. It should be noted that the ultra capacitors of energy storage 58 are charged directly by power inverter 56.

At some point during the operation of the vehicle, it may be desirable to run solely on electric power. In such a case, clutch 52 is used to disengage crankshaft 50 from input shaft 22 of transmission 20. This allows the starter/alternator 42 to operate as an motor to power the vehicle without having to rotate the crankshaft and pistons. This mode of operation is useful at low speeds such as in city driving. When desired, system controller 54 can control the system to operate with the engine, and the starter/alternator 42 can operate as an alternator to charge the batteries.

The starter/alternator has a higher inertial load than that normally seen by an engine. The starter/alternator may be used as a torque source to reduce inertial load. While the engine is operating, the starter/alternator may be powered to counteract its inertial load. Thus, the inertial load that the engine sees may be controlled to that which the engine would see without a starter/alternator system. That is, the starter/alternator may provide a non-driving torque to reduce inertial load.

While particular embodiments of the invention have been shown and described, numerous variations and alternate embodiments will occur to those skilled in the art. Accordingly, it is intended that the invention be limited only in terms of the appended claims.

What is claimed is:

1. A starter/alternator system for an automotive vehicle comprising:

an internal combustion engine having a crankshaft coupled to pistons and a flywheel coupled to said crankshaft;

a transmission having an input shaft;

a starter/alternator having a rotor and a stator, said rotor fixedly coupled to the input shaft, said rotor comprising a rotor carder and a rotor coil, said rotor carrier comprising a radially extending portion and an annular portion spaced from said input shaft, said annular portion having an inner surface and outer surface wherein said rotor coil is fixedly coupled to said outer surface; and a clutch selectively coupling said input shaft and said crankshaft, said clutch comprising an actuator, a first friction plate and a second friction plate, said clutch having a first friction plate carried on said flywheel, a first separator plate slidably coupled to said inner surface of said rotor, and actuator for selectively moving said first separator plate into engagement with said first friction plate.

2. A starter/alternator system as recited in claim 1 wherein said rotor comprising a nose portion coaxial with said input shaft and said crankshaft.

3. A starter/alternator system as recited in claim 1 wherein said actuator comprises a slave cylinder operatively coupled to said first separator plate.

4. A system for an automotive vehicle comprising:

an internal combustion engine having a crankshaft fixedly coupled to a flywheel;

a transmission having an input shaft;

a starter/alternator having a rotor and a stator, said rotor having a carrier fixedly coupled to the transmission input and a rotor coil, said carrier having a radially extending portion, and an annular portion spaced from said input shaft, said annular portion having an inner surface and outer surface, said rotor coil is fixedly coupled to said outer surface; and a clutch mechanism selectively coupling said input shaft to said crankshaft, said clutch having a first friction plate carried on said flywheel, a first separator plate slidably coupled to said inner surface of said rotor, and an actuator for selectively moving said first friction plate into engagement with said first separator plate.

5. A system as recited in claim 4 wherein said actuator comprising a diaphragm spring pivotally coupled to said carrier and a slave cylinder operatively coupled to said diaphragm spring.

6. A system as recited in claim 5 wherein said diaphragm spring is pivotally coupled to said radially extending portion.

7. A system as recited in claim 4 further comprising a controller coupled to the starter/alternator to control the engagement and disengagement of the crankshaft and the input shaft.

8. A system as recited in claim 4 further comprising a bearing for rotatably coupling said rotor carrier and said crankshaft.

9. A system as recited in claim 8 wherein said flywheel has a cup shaped portion receiving said bearing.

10. A system as recited in claim 8 wherein said carrier having an axially extending nose portion rotatably coupled to said bearing.

11. A system as recited in claim 7 further comprising second separator plate and a second friction plate.

12. A system as recited in claim 11 wherein said second separator plate is rotatably coupled to said rotor carrier.

13. A system as recited in claim 11 wherein said second friction plate is slidably and rotatably coupled to said flywheel.

14. A system as recited in claim 11 wherein said actuator comprises a slave cylinder and piston.

15. A system as recited in claim 11 wherein said piston moves a diaphragm spring portion into engagement with said second separator plate.

* * * * *